UNITED STATES PATENT OFFICE.

JOSEPH MATHIS AND EMIL NEUHART, OF ROCHESTER, NEW YORK.

IMPROVEMENT IN COVERING BOTTLES.

Specification forming part of Letters Patent No. 172,575, dated January 25, 1876; application filed December 23, 1875.

*To all whom it may concern:*

Be it known that we, JOSEPH MATHIS and EMIL NEUHART, respectively of the city of Rochester, in the county of Monroe and State of New York, have jointly invented new and useful Improvements in Covering Bottles; and we do hereby declare the following to be a full, clear, and exact description of its composition and application, sufficient to enable those skilled in the art to which it appertains to prepare and make use of the same, which will now be described.

Our invention relates to rustic coverings for bottles; and its object is to imitate in a bottle the natural growth of a trunk of a small tree, the same being surrounded with the knots of cut-off irregular outgrowths, all having the bark left on and interspersed with patches of some variety of genuine moss. It consists in a bottle or other article covered with a plastic compound composed of the following enumerated ingredients, and prepared as follows:

Take any quantity of rag-made paper, and in pure soft water reduce the same to a pulp; then draw off the water, and by any preferred means sufficiently compact the pulp, so that when separated for removal it can be handled in lumps or cakes. At the same time, in pure soft water, reduce animal glue to a solution, and by cooking bring the same to the condition as used in gluing up cabinet-work. Mix the same when hot with just enough of the paper-pulp to produce a thick paste or dough. With a glue-brush give the bottle a coat of the prepared liquid glue, immediately after which, and before the said coat of glue "sets," by hand or spatula, spread over the same a coat of the paste about three-sixteenths of an inch thick, leaving at the same time the nozzle open for a cork, the bottom, to aid the illusion, being concealed by a veneer from the endwise section of some kind of wood, and the paste pressed over on the veneer far enough when dry to unite them, and produce a continuous compact covering for the bottle. Before the paste sets, previously-prepared small cylindrical sections of some kind of wood, of any desired length or diameter, are pressed endwise through the paste to the contour of the bottle, and made to occupy any irregular or fancied positions desired, in such numbers as taste dictates, when the paste is pressed to and up the sides of the wood knots, rendering them, on the drying of the paste, firm and secure, the object of which knots being to aid the illusion of the bottle being a section of a tree-trunk; and, further, to imitate the bark of a tree, the paste coating, before hardening, is, by any preferred means, channeled, ribbed, interlaced in any manner fancy may suggest, after which, at any points on this coating, some variety of genuine moss is attached by glue, which completes the invention for use, except that it is set aside in a drying-room to harden for a longer or shorter time, as may be necessary.

Having described our invention in coating bottles or other articles, what we claim, and wish to secure by Letters Patent of the United States, is—

An improved envelope for bottles, consisting of dough composed of paper-pulp and cooked glue, and having cylindrical sections of wood protruding through the envelope, and provided with channels worked into its surface, patches of moss attached to its outside, and a wood-veneer bottom, all arranged and applied for the purposes substantially as set forth.

In testimony whereof we have hereunto set our hands.

JOSEPH MATHIS.
EMIL NEUHART.

Witnesses:
FRANK KINGSLEY,
B. F. PARSONS.